United States Patent
Grinberg

(10) Patent No.: US 7,313,634 B1
(45) Date of Patent: Dec. 25, 2007

(54) TECHNIQUES FOR IMPORTING COMPRESSED CONTENT PACKAGES INTO A NETWORK PORTAL

(75) Inventor: Oded Grinberg, Haifa (IL)

(73) Assignee: SAP Portals Israel Ltd., Ra'Anana (IL)

( * ) Notice: Subject to any disclaimer, the term of this patent is extended or adjusted under 35 U.S.C. 154(b) by 867 days.

(21) Appl. No.: 10/734,549

(22) Filed: Dec. 11, 2003

Related U.S. Application Data

(60) Provisional application No. 60/518,866, filed on Nov. 10, 2003.

(51) Int. Cl.
*G06F 15/16* (2006.01)

(52) U.S. Cl. .................................. 709/247; 707/101

(58) Field of Classification Search ............... 709/247, 709/217; 345/348; 717/169, 171
See application file for complete search history.

(56) References Cited

U.S. PATENT DOCUMENTS

| | | | |
|---|---|---|---|
| 6,771,384 B1 * | 8/2004 | Laverty et al. | 358/1.15 |
| 2002/0120639 A1 * | 8/2002 | Basin et al. | 707/204 |
| 2002/0147735 A1 * | 10/2002 | Nir | 707/200 |
| 2003/0140065 A1 * | 7/2003 | Lovvik et al. | 707/200 |

* cited by examiner

*Primary Examiner*—Frantz B. Jean
(74) *Attorney, Agent, or Firm*—Buckley, Maschoff & Talwalkar LLC

(57) ABSTRACT

Techniques are provided for importing a content package file that contains references to content files over a network. A content package file is compressed and bundled together with its related content file. The compressed file is then transferred to over a network to a server in one communication to save time. The compressed file is then decompressed, and the content files imported from the server machine location. The content files are placed into the same subdirectories according to how they were previously organized. A user can browse for compressed content package file in a more intuitive way without having to identify the machine name that the content files are stored in.

19 Claims, 2 Drawing Sheets

TECHNIQUES FOR IMPORTING COMPRESSED CONTENT PACKAGES INTO A NETWORK PORTAL

CROSS-REFERENCES TO RELATED APPLICATIONS

This application claims of the benefit of U.S. Provisional Application 60/518,866, filed Nov. 10, 2003, which is incorporated herein by reference.

BACKGROUND OF THE INVENTION

The present invention relates to techniques for importing content package files into a network portal, and more particularly, to techniques for importing a compressed content package file and its related content files into a network portal.

A content package file is a relational data structure that contains one or more references to content files. These content files are referred to as the first level content files. Any of the first level content files can contain one or more references to second level content files. Any of the second level content files can contain references to third level content files, and so on.

The content files reside in the same directory as the content package file or in subdirectories of the package content file directory. The directory that the content package file resides in is referred to as the base directory, and the references specified in the content package file and in any of the other content files are relative to the base directory. The base directory is typically related to the machine that the files are stored in. A content package file is written in the computer programming language Extensible Markup Language (XML).

Client-server systems can import content package files over a network to a portal server computer. The content package file is sent to a portal server along with the base directory.

When a content package file is imported, content files that are referred to in the content package file are also imported and stored on the portal server computer. The portal server concatenates the content file references to the base directory to get a path or a universal resource locator (URL). The portal server then fetches the content files from this path or URL.

The portal server establishes a separate communication with a client machine to retrieve each of the content files that are referred to within the content package file and within the content files. If numerous content files are referenced, the portal server establishes numerous communications and perform numerous file transfers to retrieve each of the content files. This process can take a significant amount of time. Also, a significant amount of overhead bytes are needed to establish each communication between a server and a client machine.

Therefore, it would be desirable to provide techniques for importing content packages through a network portal that do not require the portal server to establish multiple communications with a client machine to separately transfer each content file.

In prior art systems, the directories of the content files are shared and are in the same domain, so that a portal server can recognize the directories on the client machine. A user has to enter the client machine name before he can browse through content files so that the server portal can locate the correct directory.

A problem with this technique is that it does not provide the user with an intuitive approach to locating content files on the client machine. Therefore, it would be desirable to provide a more intuitive approach for locating the content files on the client machine.

In prior art systems, the content files had to be granted read permission in order for the portal server to be able to read and fetch the content files. It would therefore be desirable to provide a more secure and less restrictive way for content files to be transferred to a portal server.

BRIEF SUMMARY OF THE INVENTION

The present invention provides techniques for importing a content package file that contains references to content files over a network to a portal server. A content package file is bundled together with its related content files and compressed. The compressed file is then transferred from a client machine to a portal server in a single communication over a network. Alternatively, the compressed file is transferred from one server to another server in a single communication.

Using the techniques of the present invention, a bundled and compressed content package is transferred to the server in less time and using less overhead, because only one communication is established to transfer the compressed file. Because only one communication is needed to transfer the compressed file that contains the content package file and all its related content files, the content files do not need to be granted read permissions, because the portal server does not have to access the client machine to fetch the content files.

Once the compressed file is stored at the server machine location, the content files are decompressed from the compressed file. The content files are then imported from the server machine location.

The content files are placed into the same subdirectories according to how they were previously organized. This technique provides a more intuitive way for a user to locate content files, because the user does not have to identify the machine name where the content files are stored in.

According to one embodiment of the present invention, a content package file and its related content files are compressed into a zip file on a client machine or on a server machine. The zip file is then transferred to a portal server in one communication. The zip file is then unzipped, and the content files are stored on the portal server in the same subdirectories.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention provides techniques for importing content files that have been bundled together and compressed over a network. A content package file and related content files are bundled and compressed together into one file. The compressed file is imported through a network, and then decompressed, separated, and stored locally.

Figure 1:
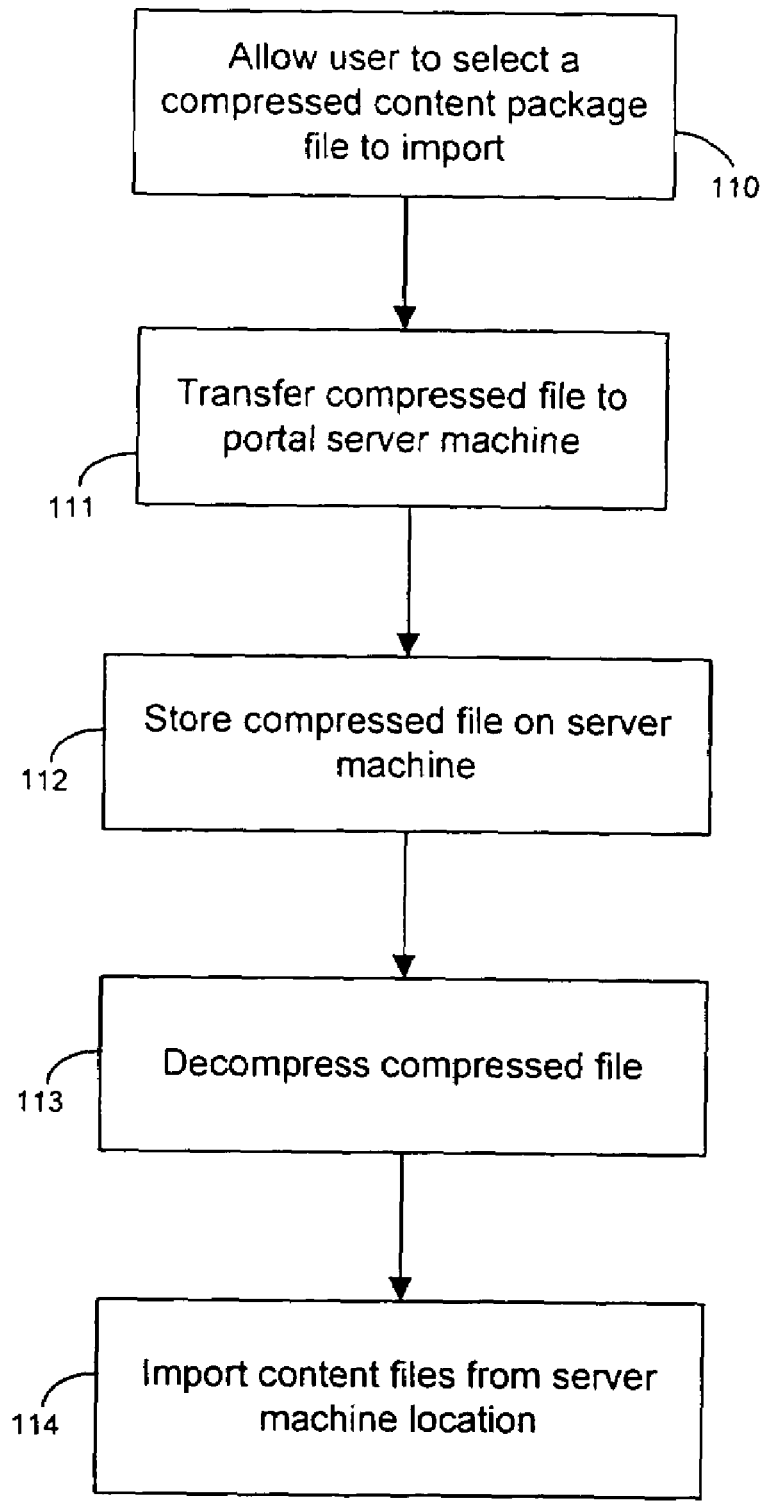
FIG. 1 illustrates a process for allowing a user to import a bundled and compressed content package file and its related content files according to an embodiment of the present invention.

FIG. 1 is a flow chart that illustrates a process performed by a portal server to import a compressed content package file according to the present invention. Before a content package file is imported, a user bundles together and compresses the content package file and all of the content files referred to in the content package file or in other content files.

As an example, a user bundles and compresses the content package file and the content files into a zip file using a ZIP compression tool. Compression is especially useful for a large sized files, because a smaller size compressed file can be imported more quickly.

Figure 3:
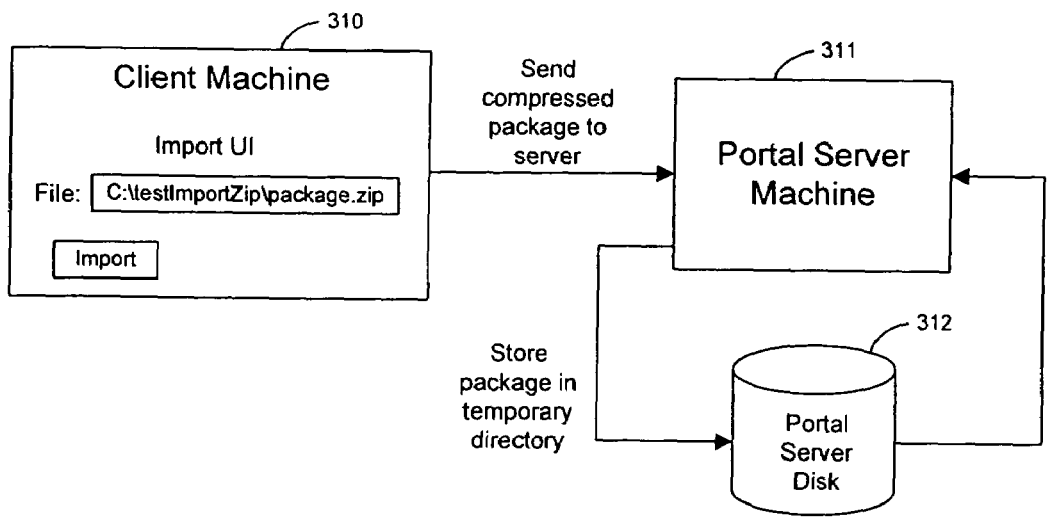
FIG. 3 illustrates a system that can be used to import a compressed content package file according to an embodiment of the present invention.

FIG. 3 illustrates an example of a client-server system. Client computer/machine 310 communicates with portal server computer/machine 311 through a network. Portal server machine 311 can store files locally in portal server disk 312.

Figure 2:
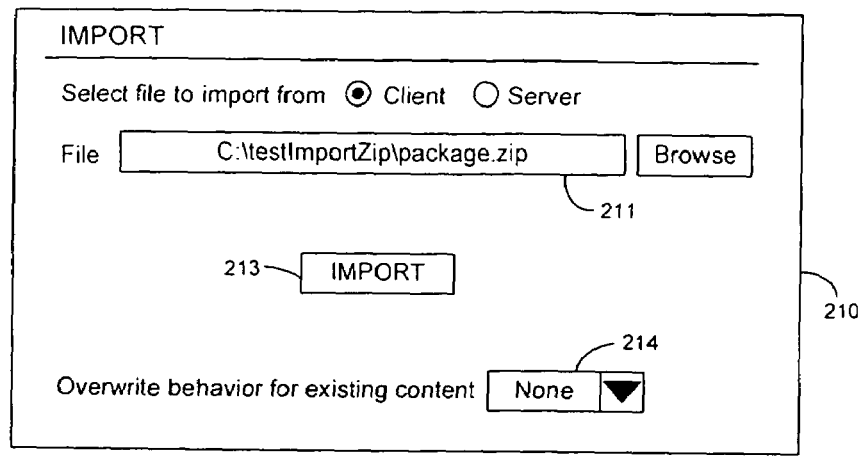
FIG. 2 illustrates an example of a display screen that allows a user to select a compressed content package file to import that file according to the present invention.

At step 110, the process of FIG. 1 allows the user to select a compressed content package file to import to a portal server. User interface 210 shown in FIG. 2 is an example of a user interface through which a user can select a compressed content package file to import. The user can type in the path or universal resource locator (URL) to a content package file in region 211. Alternatively, the user can browse for a compressed content package file by selecting the browse option.

Interface 210 allows the user to select whether to import a content package file from a client or from the portal server machine. Interface 210 also allows a user to determine whether an imported file will overwrite existing content files by selecting an option from dropdown list 214.

After the user has selected a compressed content package file, the user clicks the import button 213 to import the compressed content package file displayed in region 211. The compressed file is then transferred from client machine 310 to portal server machine 311 (or from one server to the destination server) at step 111. At step 112, the compressed file is stored in a temporary directory in portal server disk 312.

At step 113, portal server machine 311 decompresses the compressed file stored in portal server disk 312. Server 311 unzips the zip file to decompress the compressed file. Unzipping the compressed file also separates the bundled files back into the original content package and content files. The content files are organized on the server machine in the same way that they were organized on the client machine. Specifically, the content files are stored into the same subdirectories that they were stored in on the client machine.

At step 114, the content files are imported to the portal server from the portal server location and deployed in a database of the portal server. Server 311 modifies the original base directory of the content package file and the content files to refer to a new base directory on server 311, instead of client machine 310. As a result, when the references to the content files are concatenated with the new base directory, the path that is created points to the new location of the content files on the server machine.

The present invention reduces the number of communications that a server has to make with a client machine to import a content package file. A server only needs to open up one communication with a client machine to import a content package file that has been bundled and compressed with all of its related content files.

Each communication between a client and a server typically takes about the same amount of time. Because only one communication between a client and a server is required, the present invention reduces the amount of time it takes to import a content package file and its related content files.

According to the present invention, the server does not fetch the content files separately from the client machine. Therefore, a user does not have to enter the name of client machine 310 to browse through the client machine. Thus, the user can browse through the separated content files on client machine 310 in a more intuitive manner.

For the same reason, the directories of the content files do not need to be in the same domain of the server machine or stored in shared folders. The present invention eliminates the need to place the content files in shared folders within the same domain, because all of the content files are bundled together and compressed into one file before they are imported.

The user does not have to identify the new base directory, because the new base directory is based on the machine that the files are imported to (e.g., server 311), and is set automatically by the server after decompressing the compressed content package file.

Also, in the present invention, client machine 310 does not have to be in the same domain of portal server 311. The server can conduct the initial communication with a browser on the client machine using an HTTP communication, without relying on the client machine being in the same domain as the portal server. In prior art systems, the client machine has to be on the same domain as the portal server, because the portal server has to make multiple communications with the client to access content files that are stored separately on the hard drive of the client machine.

The present invention also eliminates the need to place read permission restrictions on the content files, because the client script on the client machine accesses the content files that are bundled and compressed together and transfers them all at once to the server.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method, comprising:

allowing a user to select a compressed file stored at a client machine, wherein the compressed file represents a first level content file and a content package file, the content package file comprising a relational data structure that references the first level content file using a base directory of the client machine;

transferring the compressed file across a network from the client machine to a first server in one communication;

storing the compressed file on the first server;

decompressing the compressed file at the first server to separate the first level content file and the content package file; and importing the content package file and the first level content file from the first server, wherein the content package file now references the first level content file using a base directory other than the base directory of the client machine.

2. The method according to claim 1 wherein the compressed file is a zip file.

3. The method according to claim 1 wherein the compressed file is transferred from a client machine to the first server across a network portal.

4. The method according to claim 1 wherein the compressed file is transferred from a second server to the first server across a network portal.

5. The method according to claim 1 wherein the content package file, the first level content file, and a second level content file referred to in the first level content file are compressed to form the compressed file.

6. The method according to claim 5 wherein the content package file, the first level content file, the second level content file, and a third level content file referred to in the second level content file are compressed to form the compressed file.

7. The method according to claim 6 further comprising:

storing the first, the second, and the third content files in subdirectories in an arrangement that corresponds to how the three content files were stored prior to being compressed.

8. The method according to claim 6 wherein the content package file, the first level content file, the second level content file, the third level content file, and a fourth level content file referred to in the third level content file are compressed to form the compressed file.

9. A computer system for importing a compressed content package file that comprises a computer readable media for storing codes, the codes comprising:

code for providing a user with an option to identify a compressed file at a client machine, wherein the compressed file represents a first level content file and a content package file, the content package file comprising a relational data structure that references the first level content file using a base directory of the client machine and further wherein the first level content file references a second level content file using a subdirectory of the base directory of the client machine;

code for transmitting the compressed file from the client machine to a first server using one communication through network portal;

code for storing the compressed file on the first server;

code for decompressing the compressed file at the first server to separate the first level content file, the second level content file, and the content package file; and code for importing the content package file and the first level content file from the first server, wherein the content package file now references the first level content file using a base directory of a portal server and the first level content file now references the second level content file using a subdirectory of the base directory of the portal server.

10. The computer system of claim 9 wherein the compressed file is a zip file.

11. The computer system of claim 9 wherein the compressed file is transmitted from a second server to the first server.

12. The computer system of claim 9 wherein the content package file, the first level content file, the second level content file, and a plurality of additional first level content files are compressed into the compressed file.

13. The computer system of claim 12 wherein the content package file, the first level content file, the second level content file, and a third level content file that is referred to in the content package file are compressed into the compressed file.

14. The computer system of claim 13 further comprising:

code for storing the first, the second, and the third content files in subdirectories in an arrangement that matches how the three content files were stored prior to being compressed.

15. The computer system of claim 13 wherein the content package file, the first level content file, the second level content file, the third level content file, and a fourth level content file referred to in the third level content file are compressed to form the compressed file.

16. A portal server configured to import compressed content package files, the portal server comprising:

a first routine that transfers a compressed file from a remote device to the portal server in one communication across a network portal, wherein a content package file and first level content files referred to in the content package file are compressed into the compressed file, and further wherein (1) the remote device and the portal server reside in different domains of a network and (2) the content package file and first level content files are associated with directories of different domains;

a second routine that decompresses the compressed file and separates the first level content files and the content package file; and a third routine that imports the content package file and the first level content file from the portal server.

17. The portal server of claim 16 wherein the compressed file is a zip file.

18. The portal server of claim 16 wherein the compressed file includes second level content files referred to in the first level content files.

19. The portal server of claim 16 wherein the portal server stores the first level content files in subdirectories in an arrangement that corresponds to how the first level content files were stored prior to being compressed.

* * * * *